United States Patent [19]

Pembroke

[11] 4,327,857
[45] May 4, 1982

[54] LOW INERTIAL CAPSTAN DAMPENER

[75] Inventor: Richard W. Pembroke, Tulsa, Okla.

[73] Assignee: Telex Computer Products, Inc., Tulsa, Okla.

[21] Appl. No.: 155,314

[22] Filed: Jun. 2, 1980

[51] Int. Cl.³ .................................. B65H 17/20
[52] U.S. Cl. .................................. 226/190; 242/210
[58] Field of Search .............. 226/186, 190, 191, 60; 242/192, 206, 208–210

[56] References Cited

U.S. PATENT DOCUMENTS

| 3,554,420 | 1/1971 | Agius | 226/95 |
| 3,930,603 | 1/1976 | Grant | 226/190 |
| 4,065,044 | 12/1977 | Painter et al. | 226/188 |
| 4,212,436 | 7/1980 | Schoettle et al. | 242/192 |

Primary Examiner—Leonard D. Christian
Attorney, Agent, or Firm—Head & Johnson

[57] ABSTRACT

An improved capstan for a tape drive of the type for attachment to the shaft of a drive motor, the capstan being formed of a body having low mass and providing a cylindrical tape engaging surface and means for axially securing the body to a motor shaft. The capstan body has a radial sidewall. A thin disc of a diameter no greater than that of the capstan is secured to the radial sidewall by a layer of compliant adhesive. The layer of adhesive serves to provide resilient energy-absorptive rotation movement between the capstan body and the disc to reduce the effect of capstan resonance.

2 Claims, 3 Drawing Figures

LOW INERTIAL CAPSTAN DAMPENER

BACKGROUND OF THE INVENTION

1. Field of the Invention

The invention relates to a capstan of the type utilized in high performance tape drives employed in computer applications. The invention provides improved tape handling characteristics by dampening capstan resonance.

2. Description of the Prior Art

In constructing high performance tape drives for computer applications it is important that the drive be able to rapidly reverse the direction of tape movement and, upon reversal, bring the tape from zero speed up to the performance speed (which may be as high as 200 inches per second) in the shortest possible time. Most employ a single capstan affixed directly to the shaft of a motor. The performance of the tape drive is affected by the resonance characteristics of the motor or, more precisely, the motor armature, the motor shaft and the capstan.

In order to permit most rapid acceleration or deceleration of a magnetic tape, it obviously is highly desirable that the capstan have minimum inertia. To accomplish this, capstans have been designed with are extremely light and yet rigid. Maximum efforts have been employed to devise capstans of minimum rotational inertia with required strength. Each capstan has an inherent resonant frequency. In plotting the resonance characteristics of a tape drive system, it has been found that when reducing the load inertia of a capstan for driving a short section of magnetic tape, problems are encountered in the structural design. As an example, in the case of a capstan which is structurally sound enough to drive the tape but flexes enough to allow capstan resonance at a point below the armature resonance and within the servo and data electronic band width, the performance of the tape drive is impaired. In attempting to solve this problem using the straight-forward approach of increasing the material in the capstan to reduce flexing and thereby attempting to move the resonance point outside the servo and data electronics band width, the capstan mass goes up. The increase in the mass offsets the increased stiffness of the capstan, and therefore, this attempt to solve the problem is more or less self-defeating. In addition, it is important that the tape drive be designed so that the capstan and armature/shaft resonance are not superimposed. To prevent this occurrence, then the resonance point of the capstan is below the armature/shaft resonance, much mass must be added to the capstan to raise it to a point so that its resonance is above the armature/shaft resonance to prevent superimposition. Thus, it would be highly advantageous to maintain the capstan at a minimal mass condition if some means could be found to dampen the portional resonance below the critical point of the tape drive servo loop.

It is therefore an object of this invention to provide a means of improving the performance of a tape drive by reducing the effect of the capstan resonance without materially increasing the mass of the capstan and while maintaining the resonance at a point below that of the armature/shaft resonance.

Another and more general object of this invention is to provide a capstan having improved dampening characteristics, or, stated in another way, to provide a low inertial capstan dampening means.

These general objects as well as other and more specific objects of the invention will be fulfilled in the following description and claims, taken in conjunction with the attached drawings.

SUMMARY OF THE INVENTION

An improved capstan is provided for a tape drive of the type utilized in computer systems. The capstan is of the type having low inertia. The capstan is adapted to attach to the shaft of a drive motor, the shaft being secured to the motor armature. The capstan body is formed of a structure having low mass and providing a cylindrical tape engaging surface. An axial opening in the body receives the motor shaft so that the capstan, shaft and motor armature are secured together as a unit. The capstan body has a radial sidewall. A thin disc of diameter no greater than the capstan is secured to the capstan body radial sidewall by a means of a layer of compliant low elasticity adhesive. The adhesive serves to attach the disc to the capstan sidewall and provides a resilient energy absorptive movement between the capstan and the disc. In the preferred arrangement inertia of the disc is about 1/10th that of the capstan. The effect of the compliant adhesive is to dampen the resonance of the capstan without materially changing the resonance frequency.

DESCRIPTION OF VIEWS

DETAILED DESCRIPTION

Figure 1:
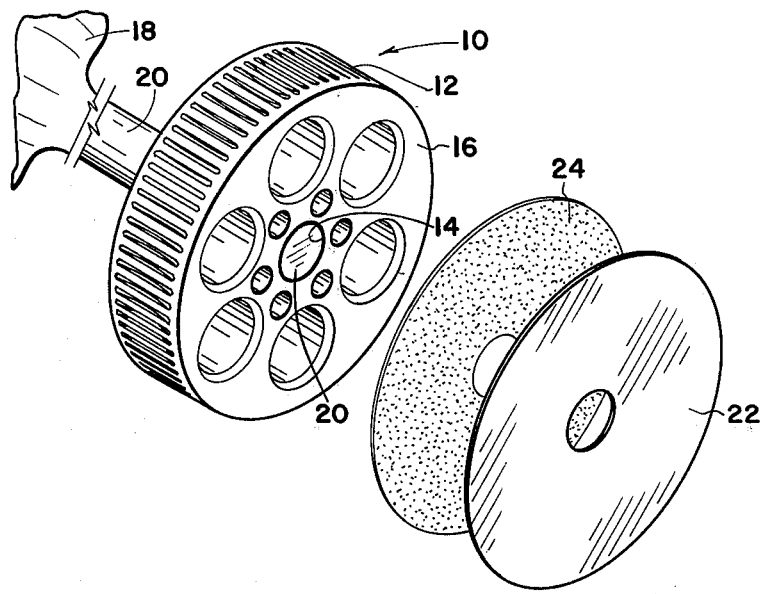
FIG. 1 is an exploded isometric view of a motor armature, a shaft and a capstan secured thereto, only a portion of the armature being shown and showing the capstan secured to the armature shaft and showing in spaced isometric relationship an inertial dampening disc and an adhesive layer by which the disc is secured to the capstan.
Figure 2:
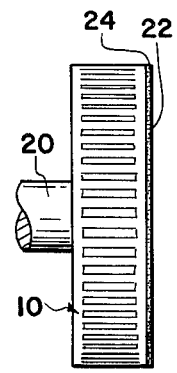
FIG. 2 is a side elevational view of the capstan secured to a shaft and with the dampening discs secured to the capstan by layer of compliant adhesive.

Referring to the drawings and first to FIGS. 1 and 2, an embodiment of the invention is illustrated. A capstan is generally indicated by the numeral 10, providing a cylindrical tape drive surface 12. The capstan has an axial opening 14 and a radial sidewall 16. In the typical application of the invention, the capstan 10 is formed of strong, lightweight metal, of thin construction, having a plurality of voids, as illustrated, to reduce mass to a minimum. The capstan 10 may be typically of two inches diameter and ½ inch thick.

Capstan 10 is driven by a motor, only the armature 18 and shaft 20 of which are shown. The motor is of the type providing minimum inertia with maximum acceleration and minimum direction reversal times. The armature 18 is typically of the "printed circuit" type, although the specific arrangement of the armature 18 is not a part of this invention.

Capstan 10 is attached to motor shaft 20 so that the armature 18, shaft 20 and capstan 10 are secured together as a unit.

Figure 3:
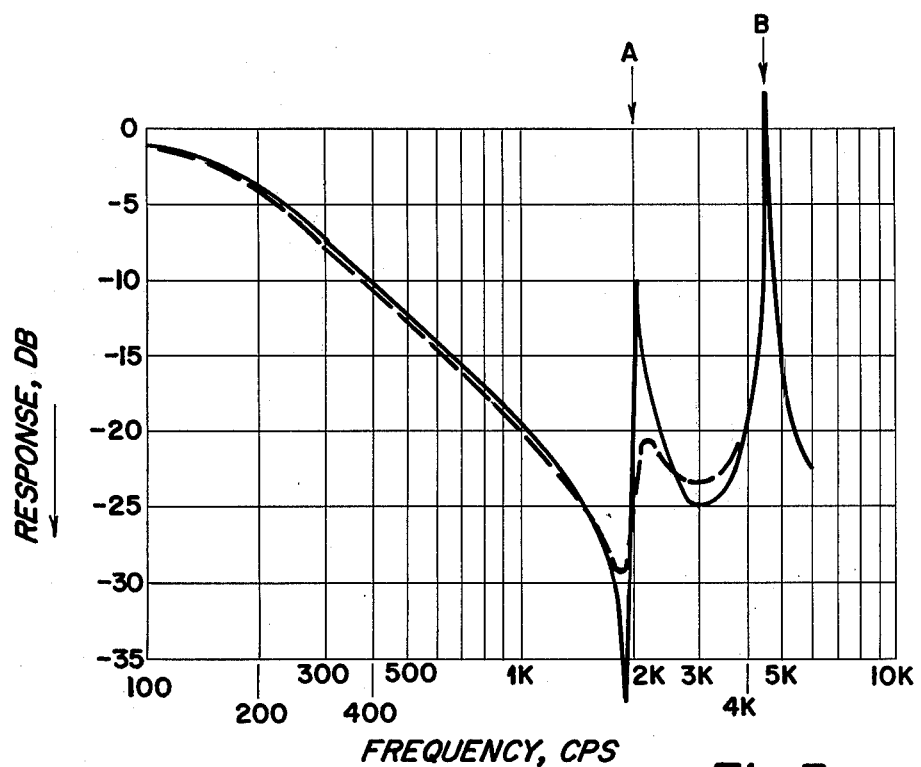
FIG. 3 is a graph showing the drive response of the tape drive apparatus relative to frequency of direction changes in cycles per second and showing in solid outline the resonance characteristics of the capstan, armature and shaft without the dampening arrangement of this invention and showing, in dotted line, the response achieved with the dampening provided by this invention.

The capstan 10, motor armature 18 and shaft 20 described up to this point are more or less standard devices employed in tape drives. A problem in high performance drives is that the capstan 10 has a natural resonant frequency. FIG. 3 shows a plot in solid outline of the tape drive response, that is, the movement of the cylindrical peripheral surface 12 of the capstan plotted in db's, versus frequency of response. At the point indicated by A, which occurs at 2,000 cps for the particular capstan evaluated, capstan resonance occurs which dramatically affects the performance of the total capstan drive. The object of this invention is to minimize capstan resonance. It is also noted in the graph of FIG. 3 that the armature/shaft resonance occurs at B which affects the performance of the tape drive; however, this occurs at a frequency of approximately 4,500 cps which is beyond normal design requirements, and therefore is not significant. However, the capstan resonance A, is below the armature/shaft resonance and within the servo and data electronics band width. Thus, the resonance which occurs at A is highly deleterious to the optimum design parameters of the tape drive.

It has been discovered that the effect of harmonic resonance can be dampened by employing an inertial dampening in the form of a thin, flat disc 22. The disc 22 preferably has an inertia of approximately 1/10th that of the capstan 10. However, if the disc 22 is affixed securely to the disc 10 it does not eliminate or minimize the effect of capstan resonance but only shift the point of resonance. In order to reduce the effect of resonance of the capstan, a compliant cement 24 is employed. The cement 24 is of negligible mass and inertial. The cement must be of the type which has three characteristics, that is, (1) it does not set hard, that is, it does not directly attach the incremental rotational movement of the capstan to the disc; (2) it must be compliant or resilient for a long time, that is, it must not dry out or harden for the life expectancy of the capstan-disc combination, and (3) it must be of a compliance or elasticity which is considered "dead," that is, wherein upon deformation of the cement it returns slowly to the original state. It may therefore be said that the compliant cement has low elasticity.

The chart of the response of the capstan with disc affixed by means of compliant adhesive 24 is shown in FIG. 3 in dotted outline. The application of disc 22 has minimal effect on the response characteristics of the capstan except at the point A where capstan resonance occurs. Note that by use of the disc 22 as indicated in the dashed graph, the effect of capstan resonance is greatly minimized. Use of the disc does not eliminate resonance, however, it substantially decreases the change in characteristics of the tape drive at the normal frequency of resonance of the capstan.

As previously stated, the capstan is typically about $\frac{1}{2}''$ thick, in which case the disc 22 may be of aluminum and about 0.003" thick while the compliant cement 24 is approximately 0.004" thick.

Many types of compliant adhesives have been tried to find the one commercially available having superior characteristics for use in practicing the invention. The adhesive found to work best of those tried is manufactured by Minnesota Mining and Manufacturing Company (3M) and is identified by Number 465. This is an A-40 family acrylic medium firm pressure sensitive double-sided transfer tape. Other adhesives or double-sided transfer tapes may satisfy the requirements above-enumerated for the adhesive necessary to secure the disc 22 to the capstan 10. By "adhesive" as used herein is meant any liquid or semi-solid material for securing the disc to the capstan, or double-sided tape, which meets the requirements set forth above.

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element or step thereof is entitled.

What is claimed:

1. An improved capstan for a tape drive, the capstan being adapted for attachment to the shaft of a drive motor, comprising:

a capstan body of low mass having a cylindrical tape engaging surface, an axial opening for engaging a motor shaft, and a radial sidewall;

a thin disc of diameter no greater than that of the capstan; and a layer of compliant adhesive positioned between said capstan sidewall and said disc, the adhesive serving to attach said disc to said sidewall and provide resilient energy absorptive limited rotational movement therebetween.

2. An improved capstan for a tape drive according to claim 1 in which the inertia of said disc is about 1/10th the inertia of said capstan.

* * * * *